United States Patent
Mutoh et al.

(10) Patent No.: US 9,611,820 B2
(45) Date of Patent: Apr. 4, 2017

(54) INTAKE STRUCTURE FOR INTERNAL COMBUSTION ENGINE

(71) Applicant: YAMABIKO CORPORATION, Tokyo (JP)

(72) Inventors: Hiroki Mutoh, Tokyo (JP); Masayoshi Miyamoto, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 194 days.

(21) Appl. No.: 14/662,135

(22) Filed: Mar. 18, 2015

(65) Prior Publication Data

US 2015/0285197 A1 Oct. 8, 2015

(30) Foreign Application Priority Data

Apr. 3, 2014 (JP) .................................. 2014-77138

(51) Int. Cl.
| | |
|---|---|
| *F02M 35/02* | (2006.01) |
| *F02M 35/10* | (2006.01) |
| *F02M 35/04* | (2006.01) |
| *F02M 17/34* | (2006.01) |
| *F02M 33/04* | (2006.01) |

(52) U.S. Cl.
CPC .... *F02M 35/10078* (2013.01); *F02M 35/044* (2013.01); *F02M 35/10144* (2013.01); *F02M 35/10262* (2013.01); *F02M 17/34* (2013.01); *F02M 33/04* (2013.01); *F02M 35/1017* (2013.01); *F02M 35/1019* (2013.01); *F02M 35/10196* (2013.01); *Y02T 10/146* (2013.01)

(58) Field of Classification Search
CPC ........... F02M 35/10078; F02M 35/044; F02M 35/10144; F02M 35/1019; F02M 35/10262; F02M 17/34; F02M 33/04; F02M 35/1017; Y02T 10/146
USPC ......................................... 123/184.21–184.61
See application file for complete search history.

(56) References Cited

U.S. PATENT DOCUMENTS

| | | | | |
|---|---|---|---|---|
| 4,344,394 A | * | 8/1982 | Showalter ............... | F02B 31/06 123/184.21 |
| 2008/0120951 A1 | * | 5/2008 | Sato ................... | B01D 46/0002 55/418 |
| 2009/0283079 A1 | * | 11/2009 | Tsunoda ............... | F02M 35/024 123/65 PD |

(Continued)

FOREIGN PATENT DOCUMENTS

| | | |
|---|---|---|
| JP | 60-100560 U | 7/1985 |
| JP | 2514621 B2 | 7/1996 |
| JP | 3727249 B2 | 12/2005 |

*Primary Examiner* — Marguerite McMahon
(74) *Attorney, Agent, or Firm* — Hauptman Ham, LLP

(57) ABSTRACT

The intake structure for an internal combustion engine includes: a collision surface configured to face an inlet of a carburetor; a deflecting surface configured to deflect a blowback flow, which is to diffuse after colliding against the collision surface, in one direction along the collision surface; a receiving surface configured to receive the blowback flow deflected by the deflecting surface; and a fuel-accumulating surface formed below the collision surface. A first clearance between an air-guiding direction distal end of the deflecting surface and the receiving surface is brought into communication to a downstream side of a filter of an air cleaner in a fresh-air intake direction so as to act as a main intake passage for fresh air.

10 Claims, 6 Drawing Sheets

(56) References Cited

U.S. PATENT DOCUMENTS

2013/0098325 A1\* 4/2013 Fukushima ............ F02M 17/34
                                                      123/184.23

\* cited by examiner

INTAKE STRUCTURE FOR INTERNAL COMBUSTION ENGINE

CROSS REFERENCE TO RELATED APPLICATIONS

This application is based upon and claims the benefit of priority under from the prior Japanese Patent Application No. 2014-77138, filed on Apr. 3, 2014, the entire contents of which is hereby incorporated by references.

BACKGROUND OF THE INVENTION

1. Field of the Invention

The present invention relates to an intake structure for an internal combustion engine for preventing a filter of an air cleaner from being contaminated by a fuel contained in a blowback flow from an internal combustion engine.

2. Description of the Related Art

Internal combustion engines, in particular, piston valve-type two-cycle internal combustion engines have a characteristic in that a large amount of blowback of a fuel from a cylinder through a carburetor toward an air cleaner occurs. When fuel particles reach a filter of the air cleaner due to the blowback, the filter is clogged. As a result, an engine output is lowered. Thus, in order to block the blowback of the fuel toward the air cleaner, an anti-blowback member is provided so as to face an inlet of the carburetor. Conventionally, the anti-blowback members having various structures have been proposed (see, for example, Japanese Utility Model Application Laid-open No. Sho 60-100560 and Japanese Patent Nos. 3727249 and 2514621).

In general, the anti-blowback member is required to have an excellent blowback blocking effect for reliably blocking the blowback of the fuel from the inlet of the carburetor, whereas good fresh-air induction efficiency is required during an intake stroke of the internal combustion engine. In order to meet the requirements described above, various measures have been taken thus far. If a configuration is complex, however, there arises a problem in costs. On the other hand, if a size is increased, there arises a problem in that the requirement for downsizing of a product or components is not satisfied. In particular, for portable operating machines including the internal combustion engine as a driving source, there are strong needs for downsizing and light-weighting of a machine body. Thus, the air cleaner including the anti-blowback member is preferably formed as compact as possible.

SUMMARY OF THE INVENTION

The present invention has been made in view of the above-mentioned circumstances, and provides an intake structure for an internal combustion engine capable of providing an excellent blowback blocking effect and good fresh-air induction efficiency and meeting a downsizing requirement with a simple structure.

In order to solve the above-mentioned problems, according to one embodiment of the present invention, there is provided an intake structure for an internal combustion engine, including: a collision surface configured to face an inlet of a carburetor; a deflecting surface configured to deflect a blowback flow, which is to diffuse after colliding against the collision surface, in one direction along the collision surface; a receiving surface configured to receive the blowback flow deflected by the deflecting surface; and a fuel-accumulating surface formed below the collision surface in the gravity direction, in which a first clearance between an air-guiding direction distal end of the deflecting surface and the receiving surface is brought into communication to a downstream side of a filter of an air cleaner in a fresh-air intake direction so as to act as a main intake passage for fresh air.

According to the one embodiment of the present invention, the blowback flow blown from the inlet of the carburetor collides against the collision surface and is then to diffuse to the surroundings. The blowback flow, which is to diffuse, is guided by the deflecting surface so as to be deflected in the one direction and is then received by the receiving surface. In the process described above, the fuel contained in the blowback flow accumulates on the fuel-accumulating surface. Therefore, an excellent blowback blocking effect is provided so as to prevent the fuel contained in the blowback flow blown from the cylinder from reaching the filter.

The blowback flow received by the receiving surface is supplied to the carburetor together with the fuel accumulating on the fuel-accumulating surface by the fresh air sucked into the carburetor through the first clearance during a subsequent intake stroke. By the presence of the first clearance, good fresh-air intake efficiency is ensured.

Further, the first clearance is provided between the air-guiding direction distal end of the deflecting surface and the receiving surface so as to act as the main intake passage for the fresh air. As a result, the receiving surface also acts as a fresh-air intake guiding surface. Thus, the fuel adhering to the receiving surface is reliably delivered to the carburetor by the fresh air sucked during the subsequent intake stroke.

After colliding against the collision surface, the blowback flow is deflected by the deflecting surface and reaches the receiving surface. Thus, in the above-mentioned process, the fuel contained in the blowback flow adheres to the deflecting surface and/or the receiving surface. Thus, the fuel contained in the deflected blowback flow does not leak from the first clearance. Further, the first clearance is covered with layer formed by the deflected flow generated by the deflecting surface, which provides an air-curtain effect. Therefore, the blowback flow, which is to diffuse after colliding against the collision surface, is prevented from leaking from the first clearance. Therefore, even if the first clearance is provided large, leak prevention effect is maintained, which contributes to the improvement of the fresh-air induction efficiency.

According to the one embodiment of the present invention, the deflecting surface is formed. Therefore, a traveling distance of the blowback flow is lengthened by a distance over which the blowback flow is guided by the deflecting surface. Therefore, the fuel contained in the blowback flow is likely to accumulate on the fuel-accumulating surface under self-weight while on move. As a result, the contamination of the filter is further suppressed.

Further, the present invention has a simple configuration in which the deflecting surface, the receiving surface, and the fuel-accumulating surface are only formed around the collision surface. Therefore, the formation of the surfaces described above in proximity to the collision surface contributes to downsizing of the anti-blowback member itself. Accordingly, the present invention contributes to downsizing of the air cleaner including the anti-blowback member.

In one embodiment of the present invention, the intake structure may be configured to as the anti-blowback member including the collision surface, the deflecting surface, the receiving surface, and the fuel-accumulating surface in an integrated manner so that the anti-blowback member is mounted inside the air cleaner for use. In another embodiment of the present invention, at least one element of the collision surface, the deflecting surface, the receiving surface, and the fuel-accumulating surface may be formed on the air cleaner so that all the elements may be provided by combining the air cleaner with the anti-blowback member.

As one exemplary embodiment of the present invention, there is exemplified such an aspect of the present invention that a distance between the deflecting surface and the collision surface is shorter than a distance between the receiving surface and the collision surface. According to the above-mentioned aspect, the blowback flow, which is to diffuse after colliding against the collision surface, first reaches the deflecting surface. Therefore, a deflecting function in the one direction, which is provided by the deflecting surface, first acts so that the air-curtain function is demonstrated by the deflected flow in an early stage. Therefore, the blowback flow, which is to diffuse after colliding against the collision surface, is reliably prevented from leaking from the first clearance.

As one exemplary embodiment of the present invention, there is exemplified such an aspect of the present invention that an air-guiding direction base end of the deflecting surface and a peripheral wall portion provided around the collision surface have no gap therebetween. According to the above-mentioned aspect, the blowback flow does not leak between the air-guiding direction base end of the deflecting surface and the peripheral wall portion. As a result, the blowback blocking effect is further ensured. Further, fresh-air intake does not occur between the air-guiding direction base end of the deflecting surface and the peripheral wall portion. Thus, a fresh-air intake amount through the first clearance increases. As a result, the functions of the first clearance as the main intake passage for the fresh air are further strongly demonstrated.

As one exemplary embodiment of the present invention, there is exemplified such an aspect of the present invention that the anti-blowback structure further includes a rectifying surface configured to rectify a flow of the fresh air toward the first clearance, the rectifying surface being formed so as to be continuous with at least one of the air-guiding direction distal end of the deflecting surface and an upper end of the receiving surface. According to the above-mentioned aspect, the fresh air more smoothly flows into the first clearance and a flow energy loss is reduced. Therefore, the fresh-air induction efficiency is further improved.

As one exemplary embodiment of the present invention, there is exemplified such an aspect of the present invention that the deflecting surface is an inclined flat surface. In this case, the blowback flow is guided by the deflecting surface obliquely along a straight line.

As one exemplary embodiment of the present invention, there is exemplified such an aspect of the present invention that the deflecting surface is a curved surface, and a slope of a tangent of the deflecting surface gradually decreases in a direction toward the air-guiding direction distal end of the deflecting surface. According to the above-mentioned aspect, the blowback flow is guided by the deflecting surface in a curved manner. Therefore, as compared with a case where the deflecting surface is an inclined flat surface, a length over which the receiving surface is formed can be shortened. Thus, the intake structure can be more downsizing.

As one exemplary embodiment of the present invention, there is exemplified such an aspect of the present invention that the deflecting surface includes a plurality of deflecting faces formed so as to guide the blowback flow in a stepwise manner.

As one exemplary embodiment of the present invention, there is exemplified such an aspect of the present invention that the air-guiding direction base end of the deflecting surface is located closer to a center of the collision surface than the air-guiding direction distal end of the deflecting surface.

As one exemplary embodiment of the present invention, there is exemplified such an aspect of the present invention that the deflecting surface is formed at a position deviated horizontally from a vertical axis passing through the center of the collision surface.

As one exemplary embodiment of the present invention, there is exemplified such an aspect of the present invention that the anti-blowback structure further includes a cutout configured to avoid interference with a choke plate for opening and closing the inlet, and that the cutout is formed at a position at which movement of the blowback flow toward the cutout is inhibited by the deflecting surface.

According to the above-mentioned aspect, the choke plate can be provided so that the choke plate is partially exposed from the anti-blowback structure. Therefore, the anti-blowback structure can be formed compact. In this embodiment, the cutout is required to be formed so that the choke plate is partially exposed from the anti-blowback member. In this case, however, movement of the blowback flow toward the cutout is inhibited by the deflecting surface. Therefore, the blowback flow is prevented from leaking through the cutout.

DETAILED DESCRIPTION OF THE PREFERRED EMBODIMENT

Now, an embodiment of the present invention is described referring to the accompanying drawings.

Figure 1:
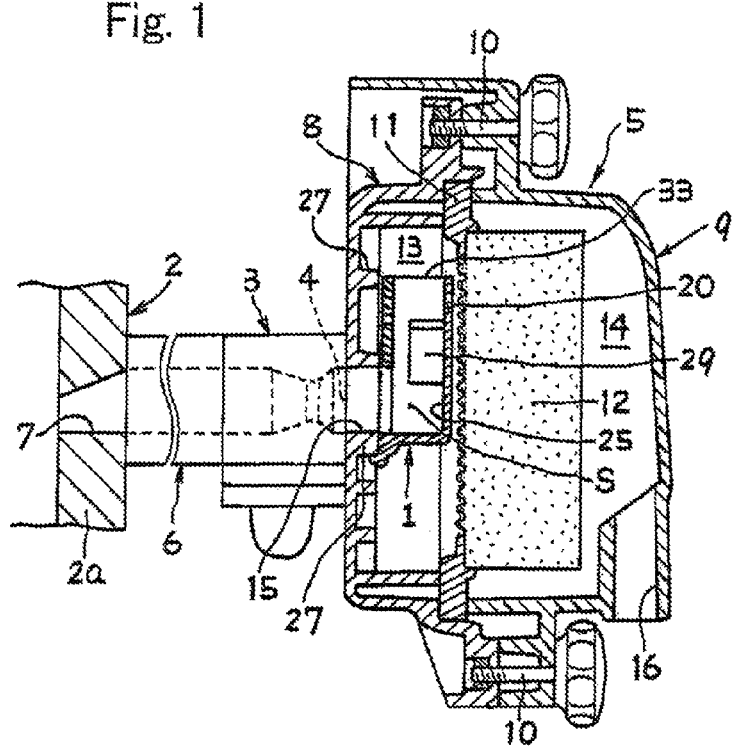
FIG. 1 is a central vertical sectional side view of an air cleaner including an intake structure for an internal combustion engine according to an embodiment of the present invention.

As illustrated in FIG. 1, an intake structure for an internal combustion engine according to the embodiment of the present invention is formed as an anti-blowback member 1. For use, the anti-blowback member 1 is mounted to an air cleaner 5 that is provided in communication to an inlet 4 of a carburetor 3 of an internal combustion engine 2. The internal combustion engine 2 is an internal combustion engine in which blowback of a fuel from a cylinder 2a through the carburetor 3 toward the air cleaner 5 occurs during actuation. Specifically, a piston valve-type two-cycle internal combustion engine is given as an example of the internal combustion engine 2. This type of internal combustion engine is frequently used as a power source for portable operating machines such as a backpack sprayer or spreader, and a backpack or handheld air blower, bush cutter, or hedge trimmer. In the above-mentioned internal combustion engine, a check valve is not provided in an intake system. Therefore, the piston valve-type two-cycle internal combustion engine has a characteristic in that a large amount of blowback of the fuel from the cylinder 2a through the carburetor 3 toward the air cleaner 5 occurs during the actuation of the internal combustion engine.

In FIG. 1, the carburetor 3 is held in communication to an intake port 7 of the cylinder 2a of the internal combustion engine 2 through a heat insulating body 6 therebetween. The air cleaner 5 is held in communication to the inlet 4 of the carburetor 3. The air cleaner 5 includes a cleaner case 8 made of a synthetic resin or the like and a cleaner cover 9 made of a synthetic resin or the like, which is to be coupled to the cleaner case 8. The cleaner cover 9 is mountable to and removable from the cleaner case 8 with two upper and lower case bolts 10.

A filter supporting member 11 is supported so as to be interposed between the cleaner case 8 and the cleaner cover 9. A filter 12 for air cleaning is supported by the filter supporting member 11. Through the filter 12, a case-side internal space 13 and a cover-side internal space 14 are held in communication to each other. A case opening 15 is formed in the cleaner case 8 so as to face the inlet 4 of the carburetor 3. On the other hand, an intake opening 16 for allowing communication between the outside and the inside of the cleaner cover 9 is formed in the cleaner cover 9.

Figure 5:
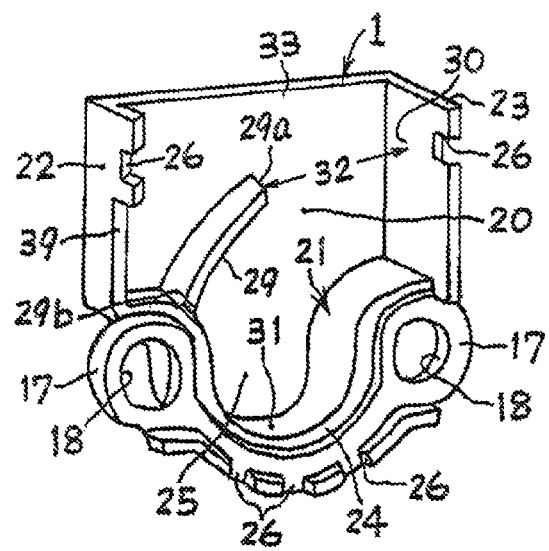
FIG. 5 is a perspective view of an inner surface side (as viewed from a carburetor side) of an anti-blowback member illustrated in FIG. 2.
Figure 6:
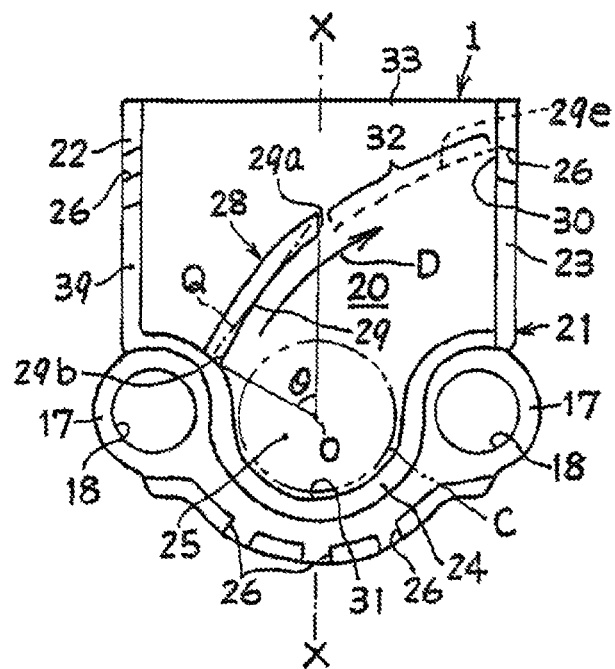
FIG. 6 is a front view of an inner surface (surface as viewed from the carburetor side) of the anti-blowback member illustrated in FIG. 2.

Inside the cleaner case 8, the anti-blowback member 1 is provided. The anti-blowback member 1 includes fixing bracket portions 17 provided on the right side and the left side, as illustrated in FIGS. 5 and 6. With two fixing bolts 19 (see FIG. 4) to be inserted through fixing holes 18 of the fixing bracket portions 17, the anti-blowback member 1 is fixed to the carburetor 3 together with the cleaner case 8. The anti-blowback member 1 blocks the blowback of the fuel from the intake port 7 of the cylinder 2a toward the air cleaner 5 so as to prevent the filter 12 of the air cleaner 5 from being contaminated by the blowback of the fuel.

As illustrated in FIGS. 5 and 6, the anti-blowback member 1 includes a flat plate portion 20 and a peripheral wall portion 21. The flat plate portion 20 faces the inlet 4. The peripheral wall portion 21 is formed on peripheral edges of the flat plate portion 20 except for an upper edge so as to be erected therefrom toward the carburetor 3. The anti-blowback member 1 is formed so as to have a concave shape with an open upper portion.

The peripheral wall portion 21 includes upper sidewall portions 22 and 23 and a lower peripheral wall portion 24. The upper sidewall portions 22 and 23 are formed on the right and left peripheral edges of a substantially upper portion of the flat plate portion 20 so as to be erected therefrom. The lower peripheral wall portion 24 is formed on the peripheral edge of a substantially lower portion of the flat plate portion 20. The fixing bracket portions 17 are formed integrally with the peripheral wall portion 21 so as to respectively project to the right and left from the lower peripheral wall portion 24. A portion of the flat plate portion 20, which faces the inlet 4, is a collision surface 25 for the blowback flow. The anti-blowback member 1 is mounted inside the cleaner case 8 so that the collision surface 25 faces the case opening 15 and the inlet 4 of the carburetor 3. A circle C indicated by the two-dot chain line in FIG. 6 indicates a position of the inlet 4 of the carburetor 3.

As illustrated in FIG. 6, in this embodiment, a gap between the collision surface 25 and the lower peripheral wall portion 24 is narrowed. The flat plate portion 20 is formed so as to have a substantially T-like shape as a whole. By forming the flat plate portion 20 as described above, an inner surface of the lower peripheral wall portion 24 is in proximity to the collision surface 25, and hence diffusion of the blowback flow after the blowback flow collides against the collision surface 25 can be further suppressed. The upper sidewall portions 22 and 23 and the lower peripheral wall portion 24 may be smoothly connected to each other so that the flat wall portion 20 is formed so as to have a bowl-like shape as a whole, as exemplified in FIGS. 8E to 8M referred to later.

A plurality of cutouts 26 are formed in the upper sidewall portions 22 and 23 and the lower peripheral wall portion 24 as illustrated in FIGS. 5 and 6. The plurality of cutouts 26 are fitted over ribs 27 (see FIG. 1) provided on an inner surface of the cleaner case 8 so as to increase the degree of close contact of the mounted anti-blowback member 1 when the anti-blowback member 1 is mounted to the cleaner case 8. In a state in which the anti-blowback member 1 is mounted to the cleaner case 8, end edges of the upper sidewall portions 22 and 23 and the lower peripheral wall portion 24 on the carburetor 3 side are brought into close contact with the inner surface of the cleaner case 8. Therefore, a blowback-flow accumulating space S is formed between the anti-blowback member 1 and the cleaner case 8 (see FIGS. 1 and 2).

As illustrated in FIG. 6, the anti-blowback member 1 includes a deflector plate 28 that is provided at a position on the outer side of the collision surface 25. The deflector plate 28 is formed on the flat plate portion 20 so as to be erected therefrom and extend over a predetermined angular range θ about the center O of the collision surface 25. A surface of the deflector plate 28, which is located on the collision surface 25 side, is a deflecting surface 29. The deflecting surface 29 deflects the blowback flow, which is to diffuse after colliding against the collision surface 25, in one direction D along the flat plate portion 20.

The deflecting surface 29 is formed at a position that is deviated horizontally from a vertical axis X-X passing through the center O of the collision surface 25. In the example illustrated in FIG. 6, the deflecting surface 29 is deviated from the vertical axis X-X to the left.

On an extended line 29e from the deflecting surface 29, one of the upper sidewall portions 22 and 23, specifically, the upper sidewall portion 23 (right upper sidewall portion illustrated in FIGS. 5 and 6) is located. At least a part of an inner surface of the upper sidewall portion 23 acts as a receiving surface 30 for receiving the blowback flow deflected by the deflecting surface 29. Therefore, the fuel contained in the blowback flow deflected by the deflecting surface 29 does not flow out of the anti-blowback member 1. Considering the function, the receiving surface 30 only needs to extend upward to a position at which the receiving surface 30 intersects the extended line 29e. In view of more reliable prevention of the upward flow of the fuel contained in the deflected flow after the collision against the receiving surface 30 out of the anti-blowback member 1, however, the receiving surface 30 is preferred to be extended upward beyond the position at which the receiving surface 30 intersects the extended line 29e.

An inner surface of the lower peripheral wall portion 24 cooperates with the collision surface 25, the deflecting surface 29, and the receiving surface 30 so as to act as a fuel confinement surface for confining the fuel contained in the blowback flow within the anti-blowback member 1. Therefore, the fuel contained within the blowback flow from the carburetor 3 is confined within the blowback-flow accumulating space S between the cleaner case 8 and the anti-blowback member 1.

A lower portion of the inner surface of the lower peripheral wall portion 24 acts as a fuel-accumulating surface 31. The fuel contained in the blowback flow after the collision against the collision surface 25 accumulates on the fuel-accumulating surface 31 under self-weight.

On the flat plate portion 20, a first clearance 32 is provided between an air-guiding direction distal end 29a of the deflecting surface 29 and the receiving surface 30. The first clearance 32 is held in communication to a downstream side of the filter 12 in a fresh-air intake direction and acts as a main intake passage for fresh air.

Specifically, the inlet 4 of the carburetor 3 is held in communication to the case-side internal space 13 through the first clearance 32 and an upper opening 33 of the anti-blowback member 1. Further, the case-side internal space 13 and the cover-side internal space 14 are held in communication to each other through the filter 12. The above-mentioned series of passages form a fresh-air intake passage. Through the fresh-air intake passage, the fresh air sucked through the intake port 16 of the cleaner cover 9 is cleaned through the filter 12 and then is smoothly sucked from the case-side internal space 13, which is located on the downstream side of the filter 12 in the fresh-air intake direction, to the carburetor 3 during an intake stroke of the internal combustion engine 2.

Next, functions and effects provided by the configuration described above are described referring to FIG. 7.

Figure 7:
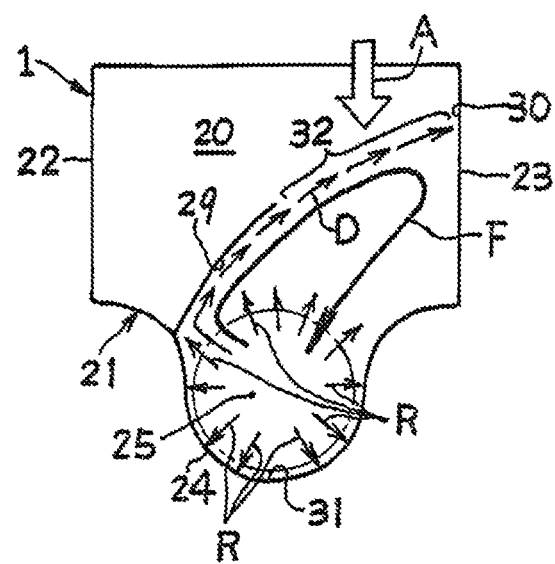
FIG. 7 is a simplified view of the anti-blowback member illustrated in FIG. 6.

The blowback flow blown from the inlet 4 of the carburetor 3 is to diffuse into the surroundings after colliding against the collision surface 25, as indicated by the arrows R in FIG. 7. The blowback flow, which is to diffuse, is guided by the deflecting surface 29 so as to be deflected in the one direction D and is then received by the receiving surface 30. In this process, the fuel contained in the blowback flow accumulates on the fuel-accumulating surface 31. Therefore, an excellent blowback blocking effect is provided so as to prevent the fuel contained in the blowback flow from the cylinder 2a from reaching the filter 12.

The blowback flow received by the receiving surface 30 is supplied to the carburetor 3 together with the fuel accumulating on the fuel-accumulating surface 31 by fresh air A sucked through the first clearance 32 into the carburetor 3 during a subsequent intake stroke. Therefore, by the repeated blowback and fresh-air intake, a horizontal rotational air flow, which is parallel to the collision surface 25, is generated inside the anti-blowback member 1, as indicated by the arrow F in FIG. 7.

Further, the first clearance 32 is provided between the air-guiding direction distal end 29a of the deflecting surface 29 and the receiving surface 30 so as to be used as the main intake passage for the fresh air A. As a result, the receiving surface 30 also acts as a fresh-air intake guiding surface. Thus, the fuel, which is received by the receiving surface 30 so as to adhere to the receiving surface 30, is reliably delivered to the carburetor 3 by the fresh air A sucked during the subsequent intake stroke.

The blowback flow, which collides against the collision surface 25, is deflected by the deflecting surface 29 to reach the receiving surface 30. Therefore, the fuel contained in the deflected flow does not leak from the first clearance 32. Further, the first clearance 32 is closed by the deflected flow generated by the deflecting surface 29, which provides an air-curtain effect. Thus, the blowback flow, which is to diffuse after colliding against the collision surface 25, is prevented from leaking from the first clearance 32. Therefore, the first clearance 32 can be provided large, which contributes to the improvement of fresh-air induction efficiency.

In this embodiment, by forming the deflecting surface 29, a traveling distance of the blowback flow within the anti-blowback member 1 is lengthened by a distance over which the fuel is guided by the deflecting surface 29 so as to be delivered. Thus, the fuel contained in the blowback flow is more likely to accumulate on the fuel-accumulating surface 31 under the self-weight while on move, thereby further suppressing the contamination of the filter 12.

Further, the configuration is simple, specifically, the deflecting surface 29, the receiving surface 30, and the fuel-accumulating surface 31 are only formed around the collision surface 25. Therefore, the formation of the above-mentioned surfaces 29, 30, and 31 in proximity to the collision surface 25 contributes to downsizing of the anti-blowback member 1 itself. Accordingly, this construction contributes to downsizing of the air cleaner 5 including the anti-blowback member 1.

For the anti-blowback member illustrated in FIGS. 1 to 7, the following matters are described as further features, functions, and effects in terms of the configuration.

(1) As is apparent from FIG. 7, in this embodiment, a distance between the deflecting surface 29 and the collision surface 25 is shorter than a distance between the receiving surface 30 and the collision surface 25. According to the above-mentioned embodiment, the blowback flow, which is to diffuse after colliding against the collision surface 25, first reaches the deflecting surface 29. Therefore, a deflecting function in the one direction, which is provided by the deflecting surface 29, first acts so that the air-curtain function is demonstrated by the deflected flow in an early stage. Therefore, the blowback flow, which is to diffuse after colliding against the collision surface 25, is reliably prevented from leaking from the first clearance 32.

(2) As illustrated in FIG. 6, an air-guiding direction base end 29b of the deflecting surface 29 is connected to the lower peripheral wall portion 24. Specifically, the air-guiding direction base end 29b of the deflecting surface 29 and the lower peripheral wall portion 24 of the anti-blowback member 1 have no gap therebetween. In this manner, there is no room between the air-guiding direction base end 29b of the deflecting surface 29 and the lower peripheral wall portion 24, from which the blowback flow leaks. Therefore, the blowback blocking effect is further ensured. Further, the fresh air is not sucked between the air-guiding direction base end 29b of the deflecting surface 29 and the lower peripheral wall portion 24. Therefore, a fresh-air intake amount through the first clearance 32 increases, thereby more strongly demonstrating the effects as the main intake passage for the fresh air.

(3) In the example of FIG. 6, the deflecting surface 29 is a curved surface, and a slope of a tangent Q of the deflecting surface 29 gradually decreases toward the air-guiding direction distal end 29a of the deflecting surface 29. When the deflecting surface 29 is formed as an inclined flat surface extending from the air-guiding direction base end 29b to the air-guiding direction distal end 29a as a comparative example, the receiving surface 30 for receiving the deflected flow is required to be provided so as to extend to a higher position. In contrast, when the deflecting surface 29 is formed as the curved surface as illustrated in FIG. 6, the blowback flow is guided by the deflecting surface 29 in a curved manner. Therefore, as compared with the case where the deflecting surface 29 is an inclined flat surface, a length over which the receiving surface 30 is formed so as to extend upward can be shortened. Thus, the anti-blowback member can be more downsizing.

(4) As is apparent from FIG. 6, the air-guiding direction base end 29*b* of the deflecting surface 29 is located closer to the center O of the collision surface 25 than the air-guiding direction distal end 29*a* of the deflecting surface 29. Therefore, the deflecting surface 29 extends so that a distance from the center O of the collision surface 25 increases in a direction from the air-guiding direction base end 29*b* toward the air-guiding direction distal end 29*a*. The air-guiding direction base end 29*b* of the deflecting surface 29 is preferred to be provided at a position as close as possible to the collision surface 25. This is because the blowback flow can be deflected as quickly as possible and reliably when the air-guiding direction base end 29*b* is located in the above-mentioned position. Further, providing the air-guiding direction base end 29*b* of the deflecting surface 29 at the position close to the collision surface 25 contributes to the downsizing of the anti-blowback member 1.

Figure 2:
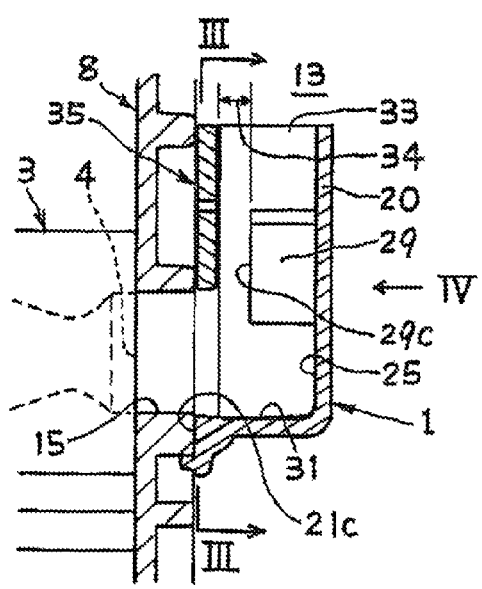
FIG. 2 is an enlarged view of a principal part of FIG. 1.

(5) As illustrated in FIG. 2, in this embodiment, an end edge 29*c* of the deflecting surface 29 on the carburetor 3 side is located farther away from the carburetor 3 than an end edge 21*c* of the peripheral wall portion 21 on the carburetor 3 side. Therefore, in a state in which the anti-blowback member 1 is mounted inside the cleaner case 8, a second clearance 34 is secured between the end edge 29*c* of the deflecting surface 29 on the carburetor 3 side and the inner surface of the cleaner case 8. Then, through the second clearance 34, the case-side internal space 13 and the case opening 15 are brought into communication to each other. Therefore, the fresh air passing through the filter 12 is sucked into the carburetor 3 not only through the first clearance 32 but also through the second clearance 34. Therefore, the fresh-air induction efficiency is further improved.

In a case where the second clearance 34 is not provided (specifically, in a case where the end edge 29*c* of the deflecting surface 29 on the carburetor 3 side is held in contact with the inner surface of the cleaner case 8), the deflecting surface 29 also functions as an upper wall portion. Therefore, the upper sidewall portion located behind the deflecting surface 29 (the left upper sidewall portion 22 in FIG. 6) can be omitted.

The inventors of the present invention conducted a test for verifying the functions and effects of the anti-blowback member illustrated in FIGS. 1 to 6 according to this embodiment. As a comparative example, an anti-blowback member obtained by eliminating the deflecting surface 29 from the anti-blowback member 1 illustrated in FIG. 6 was used. The anti-blowback members used in the test have the same configuration except for the presence and absence of the deflecting surface 29.

The details of the test are as follows. An internal combustion engine for test in a state in which the cleaner cover 9 and the filter 12 were removed from the internal combustion engine in the state illustrated in the sectional view of FIG. 1 was prepared. In place of the filter 12, a test paper sheet was fixed to the cleaner case 8. The internal combustion engine 2 was actuated in both of the case where the anti-blowback member 1 according to this embodiment was used and the case where the anti-blowback member according to the comparative example was used so that the degree of dirtiness of the test paper sheet was observed for each of the cases. It is apparent that the same conditions were set for the number of revolutions and a time period of revolution of the internal combustion engine 2 and the test paper sheet was replaced by a new one for each test.

As a result of the test, the adhesion of the fuel to the test paper sheet was found when the anti-blowback member of the comparative example was used. However, when the anti-blowback member according to this embodiment was used, the adhesion of the fuel to the test paper sheet was scarcely observed. The results confirm superiority of the anti-blowback member according to this embodiment.

(6) As a further additional configuration, a choke plate 35 is provided between the anti-blowback member 1 and the cleaner case 8 in the embodiment illustrated in FIGS. 1 to 6. The choke plate 35 is a known element that supplies a dense air-fuel mixture by temporarily closing the inlet of the carburetor so as to facilitate start of the internal combustion engine in a case where the internal combustion engine is difficult to start, for example, when it is cold.

Figure 3:
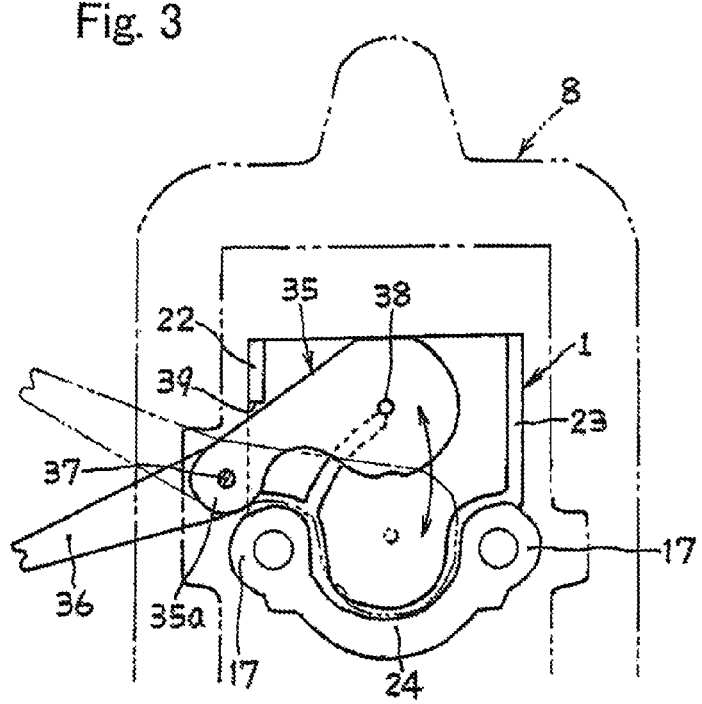
FIG. 3 is a view taken along the line III-III in FIG. 2 as viewed in a direction of the arrows.
Figure 4:
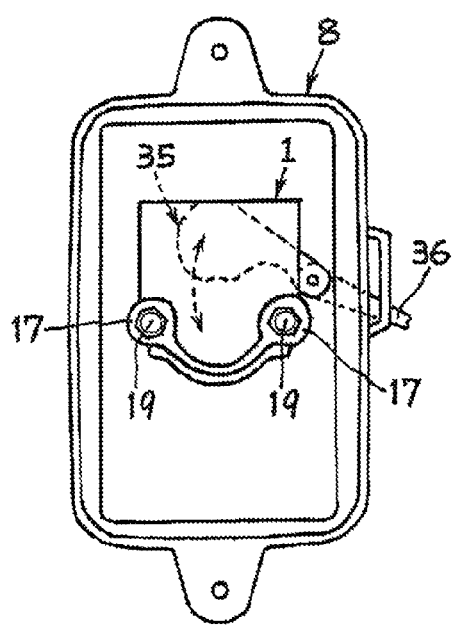
FIG. 4 is a view as viewed in a direction of the arrow IV in FIG. 2.

As illustrated in FIGS. 3 and 4, the choke plate 35 is supported swingably inside the cleaner case 8 so that a swing base end 35*a*, which is a part of the choke plate 35, is exposed from the anti-blowback member 1. Then, a choke lever 36, which is an operating member extended beyond the cleaner case 8 to the outside, is operated so as to swing vertically. As a result, the choke plate 35 vertically swings about a spindle 37.

In FIG. 3, the choke plate 35 is operated so as to swing between an open position for the inlet 4, which is indicated by the solid line, and a lower closed position indicated by the two-dot chain line. The choke plate 35 closes the case opening 15 in the closed position so as to suppress the supply of a large amount of fresh air to the inlet 4 of the carburetor 3. A small hole 38 is formed through the choke plate 35. A suitable amount of the fresh air for cold engine start is supplied through the small hole 38.

As illustrated in FIGS. 3 and 5, a cutout 39 configured to avoid interference with the choke plate 35 is formed in the anti-blowback member 1. The cutout 39 is formed at a position on the same side as the side where the deflecting surface 29 is formed with respect to the vertical axis X-X.

In the manner described above, the movement of the blowback flow in a direction toward the cutout 39 inside the anti-blowback member 1 is inhibited by the deflecting surface 29. Therefore, the blowback flow can be prevented from leaking through the cutout 39.

Next, referring to FIGS. 8A to 8M, various variations of the anti-blowback member 1 are described. In FIGS. 8A to 8M, the anti-blowback member is illustrated in a simplified manner as in the case of FIG. 7. The same elements as those of FIG. 7 are denoted by the same reference symbols as those used in FIG. 7. All the variations illustrated in FIGS. 8A to 8M fall within the scope of fundamental thought of the present invention. In FIGS. 8A to 8M, a circle indicated by the two-dot chain line represents the collision surface 25 for the blowback flow.

Figure 8A:
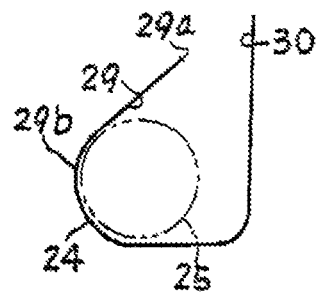
FIGS. 8A to 8M are simplified views illustrating various variations of the anti-blowback member.

(7) In a variation illustrated in FIG. 8A, the deflected surface 29 is flat. The deflecting surface 29 extends obliquely upward so as to be inclined from the air-guiding direction base end 29*b* toward the air-guiding direction distal end 29*a*. The air-guiding direction base end 29*b* of the deflecting surface 29 is held in contact with the lower peripheral wall portion 24. Therefore, the deflecting surface 29 also serves as the upper sidewall portion. The collision surface 25 is deviated to one side (to the left in FIG. 8A) of the anti-blowback member 1.

Figure 8B:
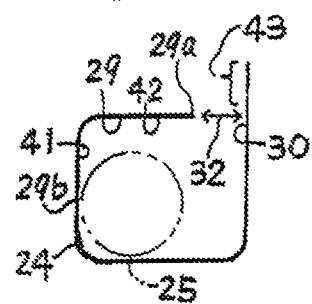

(8) In a variation illustrated in FIG. 8B, the deflecting surface 29 is bent so as to have an L-like shape. The deflecting surface 29 includes a vertical portion 41 on the air-guiding direction base end 29*b* side and a horizontal portion 42 extending horizontally from an upper end of the vertical portion 41. In view of smooth guide of the blowback flow, a bent portion between the vertical portion 41 and the horizontal portion 42 is preferred to be rounded. A lower portion of the vertical portion 41 is connected to the lower peripheral wall portion 24.

An extended surface 43 extending upward from the upper end of the receiving surface 30 is formed. The extended surface 43 acts as a rectifying surface for rectifying the flow of the fresh air toward the first clearance 32. The rectifying surface can be formed so as to be continuous with at least one of the air-guiding direction distal end 29*a* of the deflecting surface 29 and the upper end of the receiving surface 30 (see FIG. 8E). By forming the rectifying surface 43, the fresh air flows into the first clearance 32 more smoothly and a flow energy loss is reduced. Thus, the fresh-air induction efficiency is further improved.

Figure 8C:
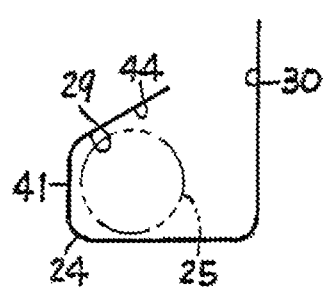

(9) In a variation illustrated in FIG. 8C, a rising inclined surface 44 is formed in place of the horizontal portion 42 as a variation of FIG. 8B.

Figure 8D:
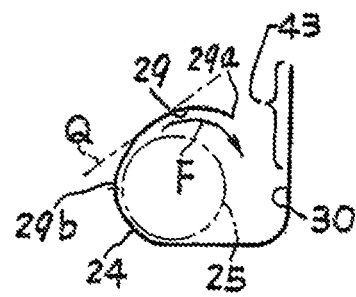

(10) In a variation illustrated in FIG. 8D, the deflecting surface 29 is greatly curved so that the flow F deflected by the deflecting surface 29 is guided obliquely downward to the right. The slope of the tangent Q of the deflecting surface 29 gradually decreases in a direction toward the receiving surface 30. Even in this variation, the air-guiding direction base end 29*b* of the deflecting surface 29 is held in contact with the lower peripheral wall portion 24. As in the case of FIG. 8B, the rectifying surface 43 for the fresh air is formed so as to be continuous with the receiving surface 30.

Figure 8E:
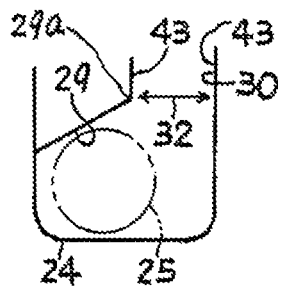

(11) In a variation illustrated in FIG. 8E, another rectifying surface 43 for rectifying the flow of the fresh air toward the first clearance 32 is additionally formed on the air-guiding direction distal end 29*a* of the deflecting surface 29 so as to be continuous therewith.

Figure 8F:
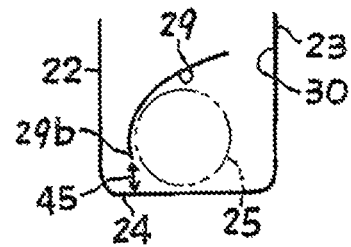

(12) In a variation illustrated in FIG. 8F, the deflecting surface 29 is formed so as to be away from the lower peripheral wall portion 24. Therefore, there is a clearance 45 between the air-guiding direction base end 29*b* of the deflecting surface 29 and the lower peripheral wall portion 24.

Figure 8G:
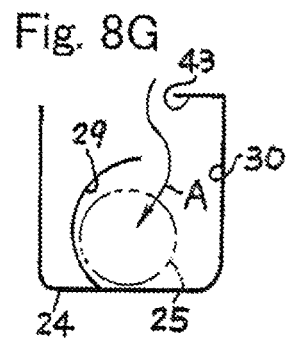

(13) In a variation illustrated in FIG. 8G, the rectifying surface 43 for the fresh air, which is formed on the upper end of the receiving surface 30 so as to be continuous therewith, is bent inward (to the left in FIG. 8G) at approximately 90 degrees, toward the inner side of the anti-blowback member 1. The arrow A in FIG. 8G indicates a flow of the fresh air rectified by the rectifying surface 43.

Figure 8H:
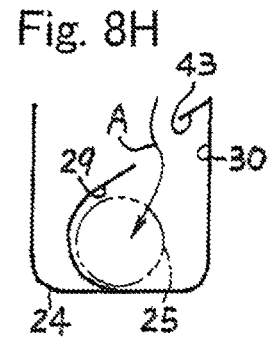

(14) In a variation illustrated in FIG. 8H, the rectifying surface 43 for the fresh air, which is formed on the upper end of the receiving surface 30 so as to be continuous therewith, is bent inward toward the inner side of the anti-blowback member 1. The rectifying surface 43 extends obliquely downward. The arrow A in FIG. 8H indicates a flow of the fresh air rectified by the rectifying surface 43.

Figure 8I:
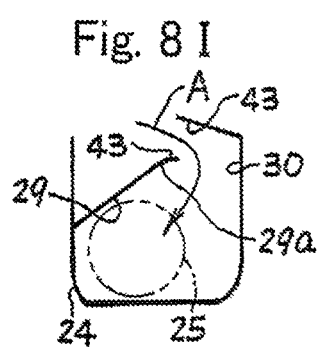

(15) In a variation illustrated in FIG. 8I, the rectifying surface 43 for the fresh air, which is formed on the upper end of the receiving surface 30 so as to be continuous therewith, is bent inward toward the inner side of the anti-blowback member 1. The rectifying surface 43 extends obliquely upward. Similarly, another rectifying surface 43 is additionally formed on the air-guiding direction distal end 29*a* of the rectifying surface 29 so as to be continuous therewith. The arrow A in FIG. 8I indicates a flow of the fresh air rectified by the rectifying surface 43.

Figure 8J:
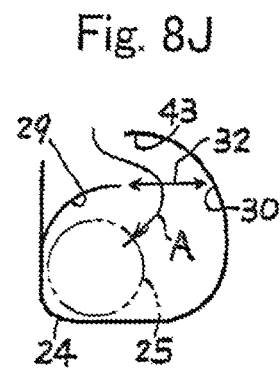

(16) In a variation illustrated in FIG. 8J, the receiving surface 30 is curved. Further, the rectifying surface 43 for the fresh air, which is formed on the upper end of the receiving surface 30 so as to be continuous therewith, is bent toward the inner side of the anti-blowback member 1. In this case, the blowback flow, which is to diffuse after colliding against the collision surface 25, is partially delivered while being curved obliquely upward to the left along the curved receiving surface 30. However, a distance between the receiving surface 30 and the collision surface 25 is set so as to be sufficiently larger than a distance between the deflecting surface 29 and the collision surface 25. Therefore, the air-curtain effect produced by the deflected flow generated by the deflecting surface 29 first works. Therefore, particles of the fuel can be prevented from being released externally through the first clearance 32.

Figure 8K:
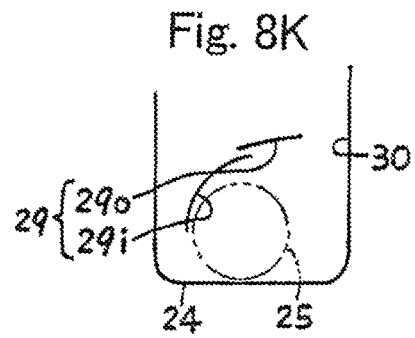

(17) In a variation illustrated in FIG. 8K, the deflecting surface 29 comprises a plurality of the deflecting faces 29*i* and 29*o* which are formed so as to guide the blowback flow in a stepwise manner. The blowback flow, which is to diffuse after colliding against the collision surface 25, is guided by an inner deflecting face 29*i* and an outer deflecting face 29*o* to reach the receiving surface 30.

Figure 8L:
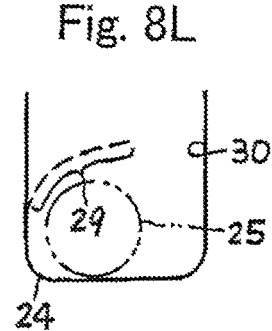

(18) A variation illustrated in FIG. 8L is an example where the deflecting surface 29 is formed intermittently. Even in this variation, the deflected flow is formed by the deflecting surface 29, thereby providing the same functions and effects as those provided by the other variations.

Figure 8M:
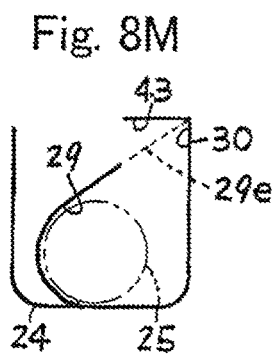

(19) In a variation illustrated in FIG. 8M, the upper end of the receiving surface 30 is located on a line extended from the deflecting surface 29. The rectifying surface 43 extends from the upper end of the receiving surface 30 to the inner side of the anti-blowback member 1 so as to form an angle of 90 degrees with the receiving surface 30.

In the description given above, the anti-blowback structure has been described with the exemplification of such aspects that the anti-blowback member 1 including the collision surface 25, the deflecting surface 29, the receiving surface 30, and the fuel-accumulating surface 31 in an integrated manner is used and the anti-blowback member 1 is mounted inside the cleaner case 8 for use. However, it is apparent that such an aspect that at least a part of the elements of the anti-blowback member 1 is provided to the cleaner case 8 is encompassed as another embodiment within the scope of the present invention. Specifically, the present invention encompasses such an aspect that at least one element of the collision surface 25, the deflecting surface 29, the receiving surface 30, and the fuel-accumulating surface 31 is formed on the cleaner case 8 so that all the elements are provided by combining the cleaner case 8 with the anti-blowback member 1 without the at least one element.

What is claimed is:

1. An intake structure for an internal combustion engine, comprising:
   a collision surface configured to face an inlet of a carburetor;
   a deflecting surface configured to deflect a blowback flow, which is to diffuse after colliding against the collision surface, in one direction along the collision surface;
   a receiving surface configured to receive the blowback flow deflected by the deflecting surface; and
   a fuel-accumulating surface formed below the collision surface in the gravity direction,
   wherein a first clearance between an air-guiding direction distal end of the deflecting surface and the receiving surface is brought into communication to a downstream side of a filter of an air cleaner in a fresh-air intake direction so as to act as a main intake passage for fresh air.

2. The intake structure for an internal combustion engine according to claim 1, wherein a distance between the deflecting surface and the collision surface is shorter than a distance between the receiving surface and the collision surface.

3. The intake structure for an internal combustion engine according to claim 1, wherein an air-guiding direction base end of the deflecting surface and a peripheral wall portion provided around the collision surface have no gap therebetween.

4. The intake structure for an internal combustion engine according to claim 1, further comprising a rectifying surface configured to rectify a flow of the fresh air toward the first clearance, the rectifying surface being formed so as to be continuous with at least one of the air-guiding direction distal end of the deflecting surface and an upper end of the receiving surface.

5. The intake structure for an internal combustion engine according to claim 1, wherein the deflecting surface comprises an inclined flat surface.

6. The intake structure for an internal combustion engine according to claim 1, wherein:

the deflecting surface comprises a curved surface; and
a slope of a tangent of the deflecting surface gradually decreases in a direction toward the air-guiding direction distal end of the deflecting surface.

7. The intake structure for an internal combustion engine according to claim 1, wherein the deflecting surface comprises a plurality of deflecting faces formed so as to guide the blowback flow in a stepwise manner.

8. The intake structure for an internal combustion engine according to claim 1, herein the air-guiding direction base end of the deflecting surface is located closer to a center of the collision surface than the air-guiding direction distal end of the deflecting surface.

9. The intake structure for an internal combustion engine according to claim 1, wherein the deflecting surface is formed at a position deviated horizontally from a vertical axis passing through the center of the collision surface.

10. The intake structure for an internal combustion engine according to claim 1, further comprising a cutout configured to avoid interference with a choke plate for opening and closing the inlet, wherein the cutout is formed at a position at which movement of the blowback flow toward the cutout is inhibited by the deflecting surface.

* * * * *